United States Patent [19]

Aizawa et al.

[11] Patent Number: 5,137,762
[45] Date of Patent: Aug. 11, 1992

[54] LAMINATED METAL PLATE FOR DRAWN CAN, AND DRAWN CAN PREPARED THEREFROM

[75] Inventors: Masanori Aizawa; Katsuhiro Imazu, both of Yokohama; Tetsuo Miyazawa, Ayase; Nobuyuki Satoh, Ebina, all of Japan

[73] Assignee: Toyo Seikan Kaisha, Ltd., Tokyo, Japan

[21] Appl. No.: 584,022

[22] Filed: Sep. 18, 1990

[30] Foreign Application Priority Data

Sep. 18, 1989 [JP] Japan .................. 1-239866

[51] Int. Cl.5 ............................. B32B 15/08
[52] U.S. Cl. ...................... 428/35.8; 413/5; 413/18; 428/414; 428/418; 428/480; 428/483; 428/458
[58] Field of Search .............. 428/480, 483, 458, 414, 428/418, 35.8; 413/5, 18; 220/415, 906

[56] References Cited

U.S. PATENT DOCUMENTS 4,614,691  9/1986  Inui et al. .................. 428/414

FOREIGN PATENT DOCUMENTS 62-86734  12/1987  Japan .
1-249331  10/1989  Japan .
2-070430   3/1990  Japan .

*Primary Examiner*—Paul J. Thibodeau
*Assistant Examiner*—Hoa T. Le
*Attorney, Agent, or Firm*—Sughrue, Mion, Zinn Macpeak & Seas

[57] ABSTRACT

Disclosed is a laminated metal plate for a drawn can, which comprises a laminate comprising a base metal, a layer of a film of a polyester composed mainly of ethylene terephthalate units and, if desried, an adhesive primer layer interposed between the base metal and the polyester film layer, wherein the X-ray diffraction intensity ratio, defined by the following formula (I), of the polyester film layer is in the range of from 0.5 to 15:

$$R_X = I_A/I_B \qquad (I)$$

wherein $R_X$ represents the X-ray diffraction intensity ratio, $I_A$ represents the X-ray diffraction intensity by the diffraction plane parallel to the surface of the polyester film, which has a spacing of about 0.34 nm (CuKα X-ray diffraction angle is 24° to 28°), and $I_B$ represents the X-ray diffraction intensity by the diffraction plane parallel to the polyester film surface, which has a spacing of about 0.39 nm (CuKα X-ray diffraction angle is 21.5° to 24°).

and the in-plane anisotropy index of the crystal of the film layer is less than 30.

When this laminated metal plate is subjected to the drawing, cracking or formation of pinholes is prevented, and the laminated metal plate shows excellent formability and corrosion resistance. An excellent drawn can is prepared from this laminated metal plate.

4 Claims, 4 Drawing Sheets

LAMINATED METAL PLATE FOR DRAWN CAN, AND DRAWN CAN PREPARED THEREFROM

BACKGROUND OF THE INVENTION

1. Field of the Invention

The present invention relates to a laminated metal plate for a drawn can, and a drawn can prepared therefrom. More particularly, the present invention relates to a laminated metal plate for a drawn can, which has excellent workability and corrosion resistance and in which cracking or formation of pinholes is prevented, and a drawn can prepared therefrom.

2. Description of the Related Art

A conventional side seamless can is prepared according to the process comprising subjecting a base metal such as an aluminium plate, a tinplate or a tinfree steel plate to drawing of at least one stage between a drawing die and a punch to form a cup comprising a side seamless wall and a bottom connected seamlessly and integrally to the wall, and, if desired, ironing the wall between an ironing punch and a die to reduce the thickness of the vessel wall. Furthermore, there is known the process in which the thickness of the side wall portion is reduced by bending and elongating by a curvature corner portion of a redrawing die instead of the above-mentioned ironing (see Japanese Examined Patent Publication No. 56-501442).

As the process for forming an organic coating on side seamless can, there are known an ordinarily widely adopted process in which a formed can is coated with an organic coating, and a process in which a resin film is laminated on a base metal before the drawing. For example, Japanese Examined Patent Publication No. 59-34580 discloses a process in which a film of a polyester derived from terephthalic acid and tetramethylene glycol is laminated on a base metal. It also is known that a metal plate coated with a vinyl-organosol, epoxy resin, phenolic resin, polyester or acrylic resin is used for producing a redrawn can be bending and elongating.

When an organic coating is formed on a base metal in advance, the coating is readily damaged by a tool at the drawing step, and at the damaged part of the coating, actual or latent exposure of the metal is caused and dissolution or corrosion of the metal is caused from this damaged part. In the production of a seamless can, such a plastic flow is brought about that the height increases in the height direction of the can but the diameter decreases in the circumferential direction of the can. By this plastic flow, the adhesion force between the metal surface and organic coating is reduced, and also the adhesion force tends to decrease with the lapse of time because of the residual strain in the organic coating or the like. This tendency is especially conspicuous when a content to be packed in a can is hot-filled or a content-filled can is heat-sterilized at a low or high temperature.

SUMMARY OF THE INVENTION

It is therefore a primary object of the present invention to provide a laminated metal plate for a drawn can, which has an excellent workability, a high corrosion resistance and a good adhesion between the base metal and the laminating film and in which cracking or formation of pinholes is prevented at the drawing step.

Another object of the present invention is to provide a drawn can in which there is no actual or latent defect in the organic film even through the can is prepared by the drawing of a metal plate having an organic film formed thereon, the adhesion between the organic film and the base metal is highly improved and therefore, excellent corrosion resistance and heat resistance can be manifested in combination.

More specifically, in accordance with the present invention, there is provided a laminated metal plate for a drawn can, which comprises a laminate comprising a base metal, a layer of a film of a polyester composed mainly of ethylene terephthalate units and, if desired, an adhesive primer layer interposed between the base metal and the polyester film layer, wherein the X-ray diffraction intensity ratio, defined by the following formula (I), of the polyester film layer is in the range of from 0.5 to 15:

$$R_X = I_A/I_B \qquad (I)$$

wherein $R_X$ represents the X-ray diffraction intensity ratio, $I_A$ represents the X-ray diffraction intensity by the diffraction plane parallel to the surface of the polyester film, which has a spacing of about 0.34 nm (CuKα X-ray diffraction angle is 24° to 28°), and $I_B$ represents the X-ray diffraction intensity by the diffraction plane parallel to the polyester film surface, which has a spacing of about 0.39 nm (CuKα X-ray diffraction angle is 21.5° to 24°), and the in-plane anisotropy index of the crystals of the film layer is less than 30.

Furthermore, in accordance with the present invention, there is provided a drawn can prepared by the drawing of a laminated metal plate as mentioned above.

BRIEF DESCRIPTION OF THE DRAWINGS

FIGS. 4-A and 4-B are diagrams illustrating examples of the sectional structure of the side wall portion.

In the drawings, reference numeral 1 represents a deep-drawn can, reference numeral 2 represents a bottom, reference numeral 3 represents a side wall portion, referential numeral 4 represents a neck portion, reference numeral 5 represents a flange, reference numeral 6 represents a base metal, reference numeral 8 represents an inner organic film, reference numeral 10 represents an outer coating, reference numerals 11a and 11b represent an adhesive layer, reference numeral 21 represents a pre-drawn cup, reference numeral 22 represents a holding member, reference numeral 23 represents a redrawing die, reference numeral 24 represents a redrawing punch, and reference numeral 26 represents a curvature corner portion.

DETAILED DESCRIPTION OF THE INVENTION

The metal plate for a drawn can according to the present invention is composed of a laminate comprising a base metal, a layer of a film of a polyester composed mainly of ethylene terephthalate units and, if desired, an adhesive primer layer interposed between the base metal and the polyester film layer. In the polyester film layer, the X-ray diffraction intensity ratio defined by the above-mentioned formula (1) is controlled to 0.5 to 15, especially 0.5 to 10, and the in-plane anisotropy index of the crystals is controlled to less than 30. By dint of these characteristics, even if the polyester film layer is placed under severe conditions at the drawing step, cracking or formation of pinholes is prevented, the workability and corrosion resistance are improved, and even at the plastic flow of the base metal, reduction of the adhesion force between the base metal and the coating film is prevented. The present invention has been completed based on the finding of these facts.

Figure 1:
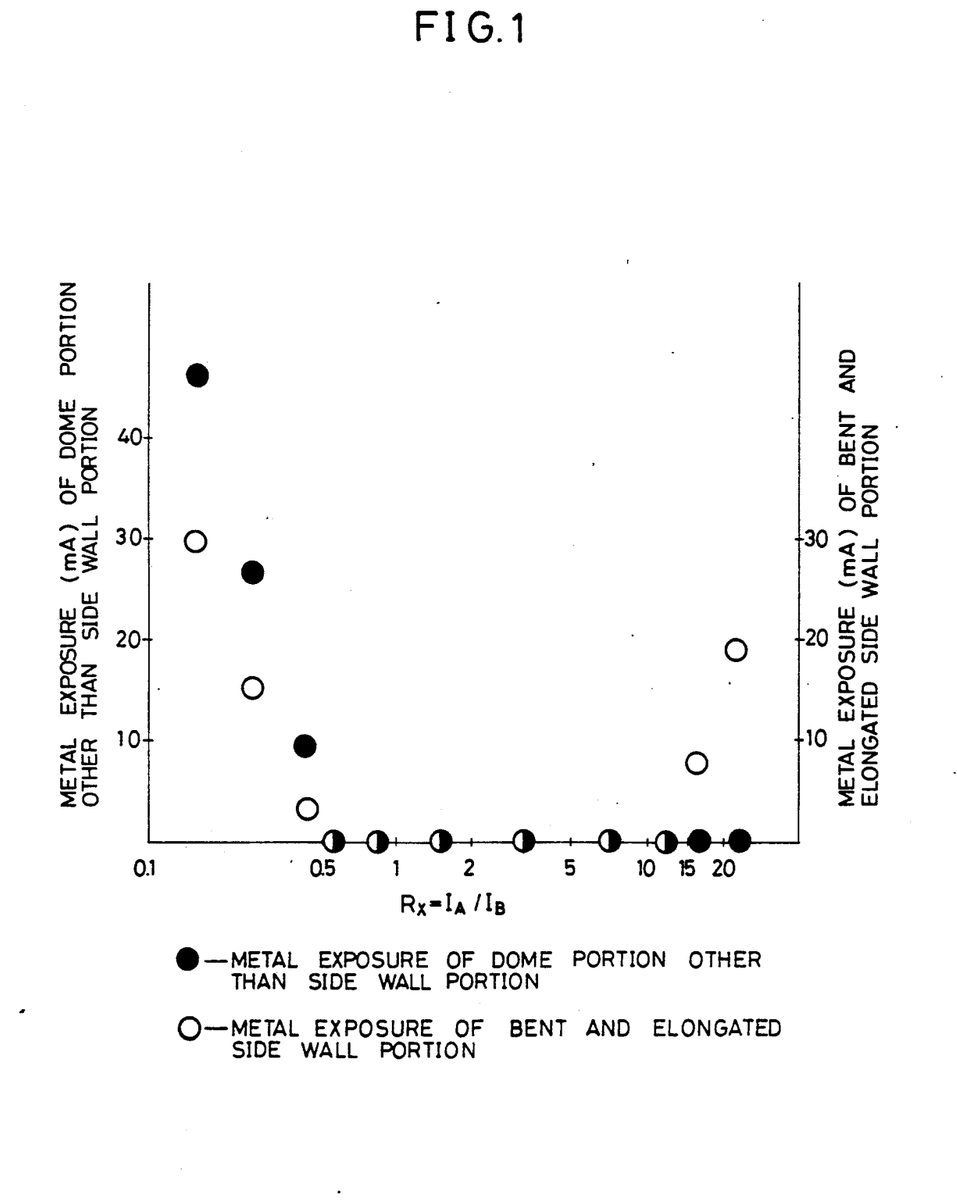
FIG. 1 is a graph illustrating the relation between $I_A/I_B$ and the metal exposure (leaking current) which is observed in a thickness-reduced, deep-drawn can prepared from a laminate of a polyester film, and a tin-free steel plate.

In FIG. 1 of the accompanying drawing, with respect to a drawn can of a tin-free steel plate laminated with a polyester film having a thickness of 20 μm, $I_A/I_B$ of a biaxially drawn polyester film having an anisotropy index of less than 30 is plotted on the abscissa and the metal exposure (enamel rater value, mA) of the draw ncan, in which a white circle indicates the metal exposure on the bent and elongated side wall portion of the drawn can and a black circle indicates the metal exposure on the dome portion, other than the side wall portion, of the drawn can is plotted on the ordinate. From the results shown in FIG. 1, it is understood that if $I_A/I_B$ is controlled to 0.5 to 15, the metal exposure can be maintained at a level lower than 0.001 mA.

$I_A/I_B$ of the biaxially drawn polyester film, referred to in the instant specification and appended claims, is determined according to the following method. Method for Measurement of $I_A/I_B$ A sample to be measured is collected from the bottom of the vessel.

The measurement is conducted according to the following procedures using an X-ray diffractometer.

The measurement conditions are as follows. Copper (wavelength $\lambda=0.1542$ nm) is used for target, the tube voltage and current are about 30 KV and about 100 mA, and a light-receiving slit having a slit width smaller than 0.1° expressed as the angle, is selected so that the two diffraction peaks of the diffraction plane having a spacing of about 0.39 nm ($2\theta$ is about 22.5°) and the diffraction plane having a spacing of about 0.34 nm ($2\theta$ is about 26°) can be separated from each other. The sample is attached so that each of the incident and reflection angles of the X-ray is $\theta$ and the incident X-ray and the diffracted X-ray are symmetric with each other with respect to the normal line to the film plane (the diffraction angle is $2\theta$), and while the incident angle $\theta$ and the reflection angle $\theta$ are always kept equal to each other, the X-ray diffraction spectrum is measured by scanning over the diffraction angle $2\theta$ range of from 20° to 30°.

Figure 2:
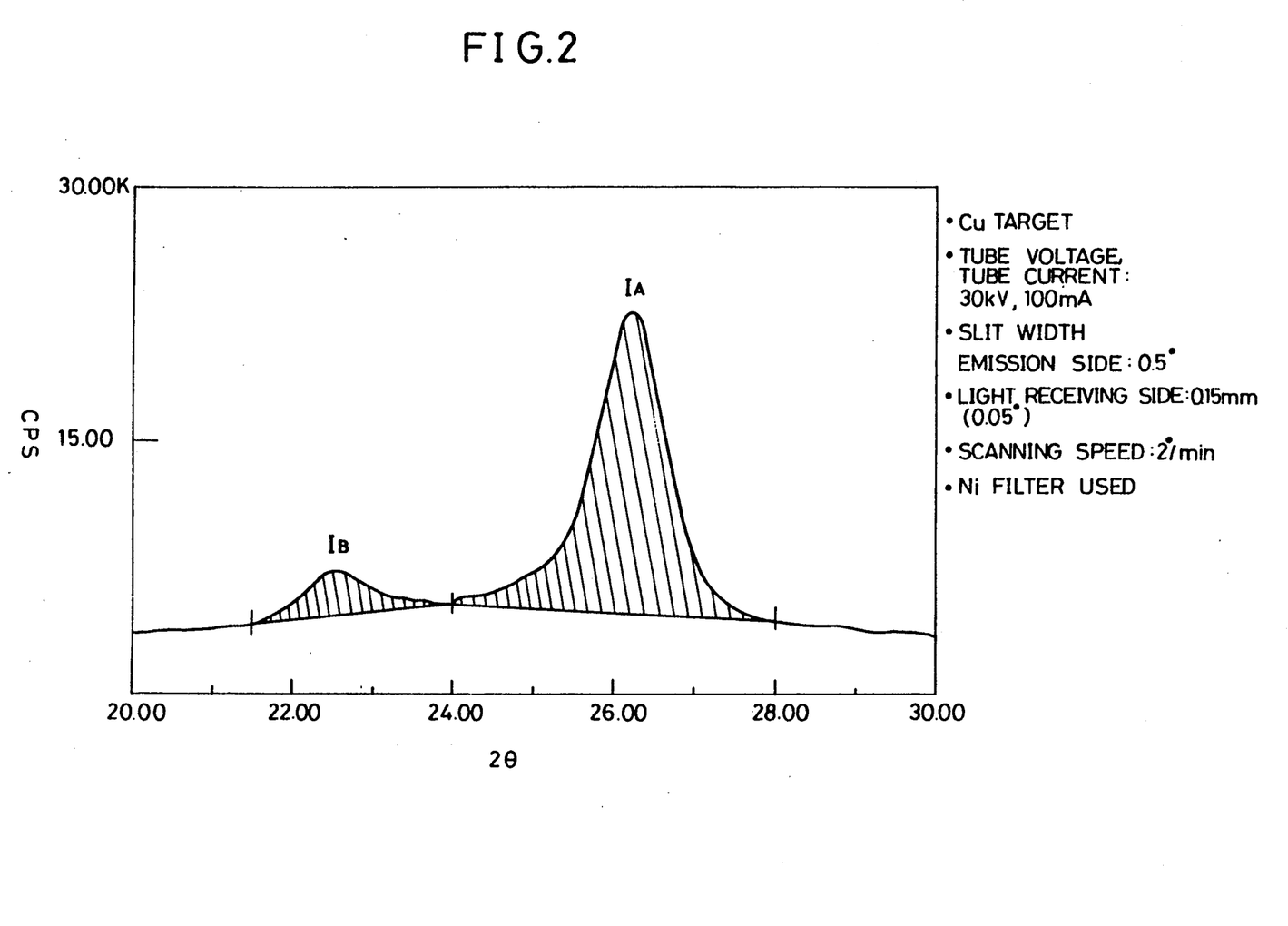
FIG. 2 is an X-ray diffraction diagram of an example of the biaxially drawn polyester film.

An example of the measurement is shown in FIG. 2.

The integrated intensities (peak areas) $I_B$ and $I_A$ of the diffraction of the diffraction plane having a spacing of about 0.39 nm ($2\theta$ is about 22.5°) and the diffraction of the diffraction plane having a spacing of about 0.34 nm ($2\theta$ is about 26°) are determined, and the intensity ratio $I_A/I_B$ is calculated. As shown in FIG. 2, straight lines are drawn as backgrounds between the intensities at $2\theta=24°$ and $2\theta=28°$ and between the intensities at $2\theta=21.5°$ and $2\theta=24°$, and in the diagram where the backgrounds are thus drawn, the intensities correspond to the hatched portions.

The anisotropy index of the in-plane orientation of the crystalsis determined in the following manner. Namely, the refractive indices are measured with respect to all the directions parallel to the film plane by using an Abbe refractometer according to customary procedures. The refractive index in the direction where the in-plane refractive index is largest is designated as $n_{max}$ and the refractive index in the direction where the in-plane refractive index is smallest is designated as $n_{min}$, and the anisotropy index is determined according to the following formula:

$$\text{Anisotropy index } (n_{max}-n_{min})\times 10^3/n_{min} \qquad (2)$$

The fact that $I_A$ and $I_B$ of a polyester film has close relations to formation of pinholes or cracking has been found as the result of trial and error based on various experiments. If the X-ray diffraction intensity ratio $I_A/I_B$ exceeds the above-mentioned range, cleavage or rupture is readily caused in the polyester by fibrilation, and pinholes are formed or cracking is caused by severe working such as drawing, neck-in processing or flanging, resulting in degradation of the corrosion resistance. If the $I_A/I_B$ value is below the above-mentioned range, the heat stability of the oriented crystalsis reduced, and as in the above-mentioned case where the intensity ratio is too high, pinholes are formed or cracking is caused, with the result that the corrosion resistance is degraded.

In the present invention, the foregoing defects are overcome by controlling $I_A/I_B$ within the above-mentioned range.

If the anisotropy index of the in-plane orientation of the crystals exceeds the above-mentioned limit, the anisotropy of the plastic flow of the polyester film at the drawing of the laminated plate becomes too large and cannot be neglected, and wrinkles are formed on the laminated surface of the film and peeling of the film is caused, with the result that the corrosion resistance is degraded.

In view of the mechanical strength, dimensional stability and heat resistance, it is preferred that the density of the polyester film in the laminate be in the range of from 1.345 to 1.395 g/cm$^3$.

The present invention will now be described in detail with reference to preferred embodiments.

Figure 3:
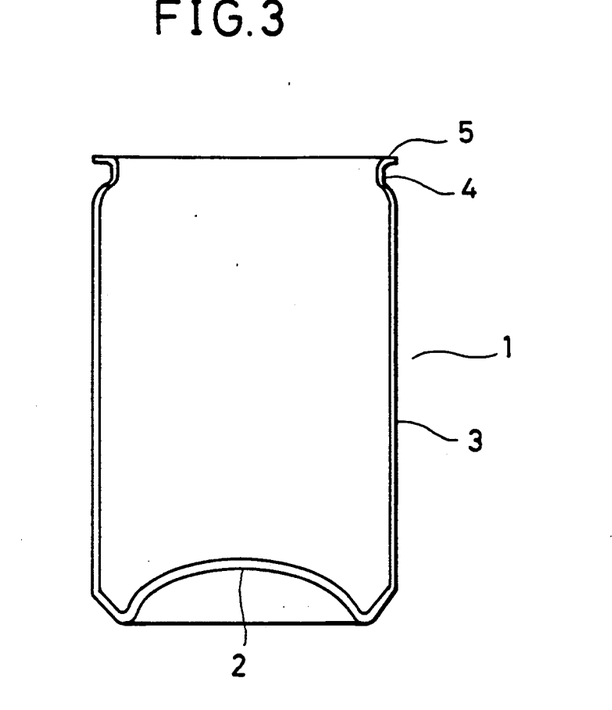
FIG. 3 is a diagram illustrating an example of the deep-drawn can of the present invention.

Referring to FIG. 3 illustrating an example of the drawn can of the present invention, this drawing can is formed by the deep drawing (drawing-redrawing) and comprises a bottom 2 and a side wall portion 3. If desired, a flange 5 is formed on the top end of the side wall portion 3 through a neck portion 4. In this can 1, the thickness of the side wall portion 3 is reduced by bending and elongating as compared with the thickness of the bottom 2.

Figure 4:
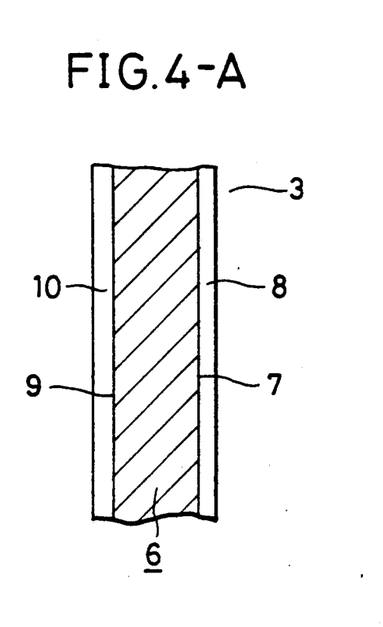

Referring to FIG. 4-A showing an example of the sectional structure of the side wall portion 3, this side wall portion 3 comprises a base metal 6, an inner organic coating 8 formed on the surface 7 of the base metal 6, and an outer coating 10 formed on the outer surface of the base metal 6, Referring to FIG. 4-B illustrating another example of the sectional structure, this sectional structure is the same as the structure shown in FIG. 4-A except that adhesive layers 11a and 11b are interposed between the metal surface 7 and the inner organic coating 8 and between the metal surface 9 and the outer organic coating 10, respectively.

In each case, the sectional structure of the bottom 2 is the same as the sectional structure of the side wall portion 3.

BASE METAL

In the present invention, various surface-treated steel plates and plates of light metals such as aluminium are used as the metal plate.

As the surface-treated steel plate, there can be used a plate formed by annealing a cold-rolled steel plate, subjecting the annealed steel plate to secondary cold rolling and subjecting the cold-rolled plate to at least one surface treatment selected from zinc plating, tin plating, nickel plating, electrolytic chromate treatment and chromate treatment. An electrolytically chromate-treatment steel plate (a tin free steel plate) is a preferred example of the surface-treated steel plate, and an electrolytically chromate-treated steel plate having 10 to 200 mg/m$^2$ of a metallic chromium layer and 1 to 50 mg/m$^2$ (as calculated as metallic chromium) of a chromium oxide layer is especially preferably used because this surface-treated steel plate has an excellent adhesion (to coating) and an excellent corrosion resistance in combination. Another example of the surface-treated steel plate is a hard tinplate having a tin deposited amount of 0.5 to 11.2 g/m$^2$, and it is preferred that this tinplate be subjected to chromate treatment or chromate/phosphate treatment so that the chromium deposited amount is 1 to 30 mg/m$^2$ as calculated as metallic chromium.

As still another example there can be mentioned an aluminum-clad steel plate formed by aluminium deposition or pressure welding of aluminium.

As the light metal plate, there can be mentioned not only a so-called pure aluminium plate but also an aluminum alloy plate. An aluminium alloy plate comprising 0.2 to 1.5% by weight of Mn, 0.8 to 5% by weight of Mg, 0.25 to 0.3% by weight of Zn and 0.15 to 0.25% by weight of Cu, with the rest being Al, has excellent corrosion resistance and excellent workability in combination. It is preferred that the light metal plates be subjected to chromate treatment or chromate/phosphate treatment so that the amount deposited of chromium is 20 to 300 mg/m$^2$ as calculated as metallic chromium.

The thickness of the metal plate, that is, the thickness ($t_B$) of the can bottom, depends on the kind of the metal, the intended use of the vessel and the size of the vessel, but in general, the thickness is preferably 0.10 to 0.50 mm. It is especially preferred that the thickness of the surface-treated steel plate be 0.10 to 0.30 mm and the thickness of the light metal plate be 0.15 to 0.40 mm.

BIAXIALLY DRAWN POLYESTER FILM

The laminate to be drawn in the present invention is characterized in that the polyester film in the laminate before the drawing has an X-ray diffraction intensity ratio satisfying formula (1) and a crystal inplane anisotropy index of less than 30. This film is prepared by forming a polyester composed mainly of ethylene terephthalate units into a film by the T-die method or the inflation film-forming method, sequentially or simultaneously biaxially drawing the film at the draw temperature, and thermally setting the drawn film. The so-formed film is laminated on a metal.

In the present invention, $I_A/I_B$ is controlled in the following manner. Namely, the $I_A/I_B$ value can be controlled by adjusting the composition of the film, the draw temperature, the draw ratio at the film-drawing step, the heat set temperature after the drawing, the lamination temperature at the step of laminating the film on the metal plate and the heat treatment of the laminate. For example, if the draw ratio at the film-drawing step is increased, $I_A/I_B$ is increased, and at the same draw ratio, if the heat set temperature after the drawing is elevated, $I_A/I_B$ can be reduced, and if the lamination temperature at the step of laminating the film on the metal plate is elevated, $I_A/I_B$ is reduced. Moreover, if the laminate is heat-treated at a temperature close to the melting point of the polyester film, $I_A/I_B$ is reduced. Furthermore, in a copolyester such as polyethylene terephthalate/isophthalate or polyethylene terephthalate/sebacate, the absolute value of $I_A/I_B$ can be reduced as compared with that of a homopolymer of polyethylene terephthalate.

In the present invention, it is important that $I_A/I_B$ of the polyester film before the drawing should be finally adjusted within the above-mentioned certain range by controlling various conditions as described above.

In the present invention, the anisotropy index of the in-plane orientation is controlled in the following manner. Namely, the anisotropy index of the in-plane orientation is controlled by adjusting the difference between the draw ratio in the MD direction and the draw ratio in the TD direction at the film-drawing step and the heat set temperature after the drawing. For example, if the difference between the draw ratio in the MD direction and the draw ratio in the TD direction is decreased, the anisotropy index is reduced, and if the heat set temperature is lowered, the anisotropy can be maintained at a low level.

The drawing of the film is generally carried out at a temperature of 80° to 110° C. and the draw ratio is selected according to the kind of the polyester and other conditions so that the area draw ratio is 2.5 to 16.0, especially 4.0 to 14.0, and that $I_A/I_B$ is within the above-mentioned range and the anisotropy index is less than 30.

The thermal setting of the film is carried out at a temperature of 130° to 240° C., especially 150° to 230° C., so that the above-mentioned conditions are satisfied.

The starting polyester will now be described. Even polyethylene terephthalate per se can be used under much restricted conditions of drawing, thermal setting, lamination and heat treatment. However, in order to obtain the above-mentioned characteristics, lowering of the attainable highest crystallization degree of the polyester is advantageous, and for this purpose, it is preferred that units of a copolymerization ester other than ethylene terephthalate be introduced into the polyester.

In the present invention, use of a biaxially drawn film of a copolyester composed mainly of ethylene terephthalate units, which contains a small amount of other ester units and has a melting point of 210° to 252° C., is especially preferred. Incidentally, the melting point of homopolyethylene terephthalate is 255° to 265° C.

In the copolyester used in the present invention, it is generally preferred that at least 70 mole %, especially at least 75 mole %, of the dibasic acid component be terephthalic acid, at least 70 mole %, especially at least 75 mole %, of the diol component be ethylene glycol, and 1 to 30 mole %, especially 5 to 25 mole %, of the dibasic acid component and/or the diol component be a dibasic acid other than terephthalic acid and/or a diol other than ethylene glycol.

As the dibasic acid other than terephthalic acid, there can be used at least one member selected from aromatic dicarboxylic acids such as isophthalic acid, phthalic acid and naphthalene-dicarboxylic acid, alicyclic dicarboxylic acids such as cyclohexane-dicarboxylic acid, and aliphatic dicarboxylic acids such as succinic acid, adipic acid, sebacic acid and dodecanedioic acid. As the diol component other than ethylene glycol, there can be used at least one member selected from propylene glycol, 1,4-butane-diol, diethylene glycol, 1,6-hexylene glycol, cyclohexane dimethanol and an ethylene oxide adduct of bisphenol A. Of course, these comonomers should be combined so that the melting point of the copolyester is within the above-mentioned range.

The copolyester used should have a film-forming molecular weight. For this purpose, a copolyester having an intrinsic viscosity (I.V.) of 0.55 to 1.9 dl/g, especially 0.65 to 1.4 dl/g, is preferably used.

It is important that the copolyester film should be biaxially drawn. The degree of the biaxial orientation can be determined according to the polarization fluorescence method, the birefringence method, the density gradient tube method and the like.

In order to attain a good balance between the barrier property to corrosive components and the workability, it is preferred that the thickness of the film be 8 to 50 μm, especially 12 to 40 μm.

Known film additives, for example, anti-blocking agents such as amorphous silica, pigments such as titamium dioxide (titanium white), antistatic agents and lubricants can be incorporated into this biaxially drawn film according to known recipes.

At the lamination step, the time required for the film to be laminated to pass through the crystallization temperature zone should be made as short as possible, and it is preferred that the film be passed through this crystallization temperature zone within 10 seconds, especially within 5 seconds. For this purpose, at the lamination step, only the base metal is heated and immediately after the lamination, the laminate is forcibly cooled. Direct contact with cold air or pressing contact with a cooling roller forcibly cooled is adopted for this cooling. It should be understood that if the film is heated at a temperature close to the melting point at the lamination step and the film is rapidly cooled after the lamination, the crystal orientation degree can be moderated.

In the case where an adhesive primer is used, in order to increase the adhesion of the film to the adhesive primer, it is generally preferred that the surface of the biaxially drawn copolyester film be subjected to corona discharge treatment. Preferably, the degree of the corona discharge treatment is such that the wet tension of the treated film is at least 44 dyne/cm.

Furthermore, for the improvement of adhesion the film can be subjected to a known surface treatment such as plasma treatment or flame treatment, or a known coating treatment with a urethane resin or a modified polyester resin.

ADHESIVE PRIMER

An adhesive primer is interposed between the polyester film and the base metal, if desired, and this adhesive primer has an adhesion to both of the base metal and the film. As a typical instance of the primer coating having excellent adhesion and corrosion resistance, there can be mentioned a phenol-epoxy coating comprising a resol type phenol-aldehyde resin derived from a phenol and formaldehyde and a bisphenol type epoxy resin at a phenolic resin/epoxy resin weight ratio of from 50/50 to 5/95, especially from 40/60 to 10/90.

It is generally preferred that the adhesive primer layer be formed in a thickness of 0.3 to 5 μm. The adhesive primer layer may be formed on the base metal or on the polyester film in advance.

In the present invention, it is indispensable that the surface, to be formed into an inner face of a can, of the laminated metal plate should be composed of the polyester film layer, but the surface to be formed into an outer face can be composed of the same polyester film layer or other plastic film layer, or may be composed of a thermosetting resin coating customarily used for cans, such as a phenol-aldehyde resin, a furan rein, a xyleneformaldehyde resin, a ketone-formaldehyde resin, a urea resin, a melamine resin, an aniline resin, an alkyd resin, a guanamine resin, an unsaturated polyester resin, an epoxy resin, a thermosetting acrylic resin, a triallyl cyanurate resin, a bismaleimide resin, an oleoresinous coating, a thermosetting acrylic coating and a thermosetting vinyl coating. A mixture of two or more of these thermosetting coatings can be used.

PREPARATION PROCESS

According to one embodiment of the present invention, the biaxially drawn polyester film and base metal are press-bonded and laminated under such conditions that only the surface layer portion of the film contiguous to the base metal is melted. According to this embodiment, the base metal is preliminarily heated at a temperature higher than the softening point of the polyester and immediately after he lamination, the laminate is rapidly quenched.

According to another embodiment of the present invention, the biaxially drawn polyester film and the base metal are press-bonded and laminated through an adhesive layer formed on one of them.

According to a preferred embodiment of the present invention, a laminate plate for a drawn can is prepared by a process comprising the steps of coating a thermosetting adhesive primer such as an epoxy type primer on one surface of a biaxially drawn polyester film, laminating the polyester film on a base metal at such a positional relation that the adhesive primer layer confronts the base metal, and, if necessary, forming an outer surface-protecting coating film on the surface, to be formed into an outer face of the can, of the base metal.

There can be adopted a method in which both the inner and outer surfaces of the laminate plate are simultaneously coated by a coil coater and the laminate plate is subjected to a baking treatment to simultaneously cure the adhesive layer and the outer surface-protecting coating.

According to another preferred embodiment of the present invention, a laminate plate for a drawn can is prepared by a process comprising the steps of coating a thermosetting adhesive primer such as an epoxy primer on a surface of a biaxially drawn polyester film, applying the coated polyester film to at least one surface of a base metal at such a positional relation that the adhesive primer layer confronts the base metal and heat-treating the obtained laminate under such conditions that the thermosetting resin film of the adhesive primer layer is cured.

According to still another preferred embodiment, a laminate plate for a drawn can is prepared by a process comprising the steps of coating a thermosetting adhesive primer on a surface of a base metal, heat-treating the coated metal under such conditions that the thermosetting resin coating film of the adhesive primer layer is cured, and heat-press-bonding a biaxially draw polyester film to the coated base metal at such a positional relation that the primer coating layer of the coated base metal confronts the polyester film.

Figure 5:
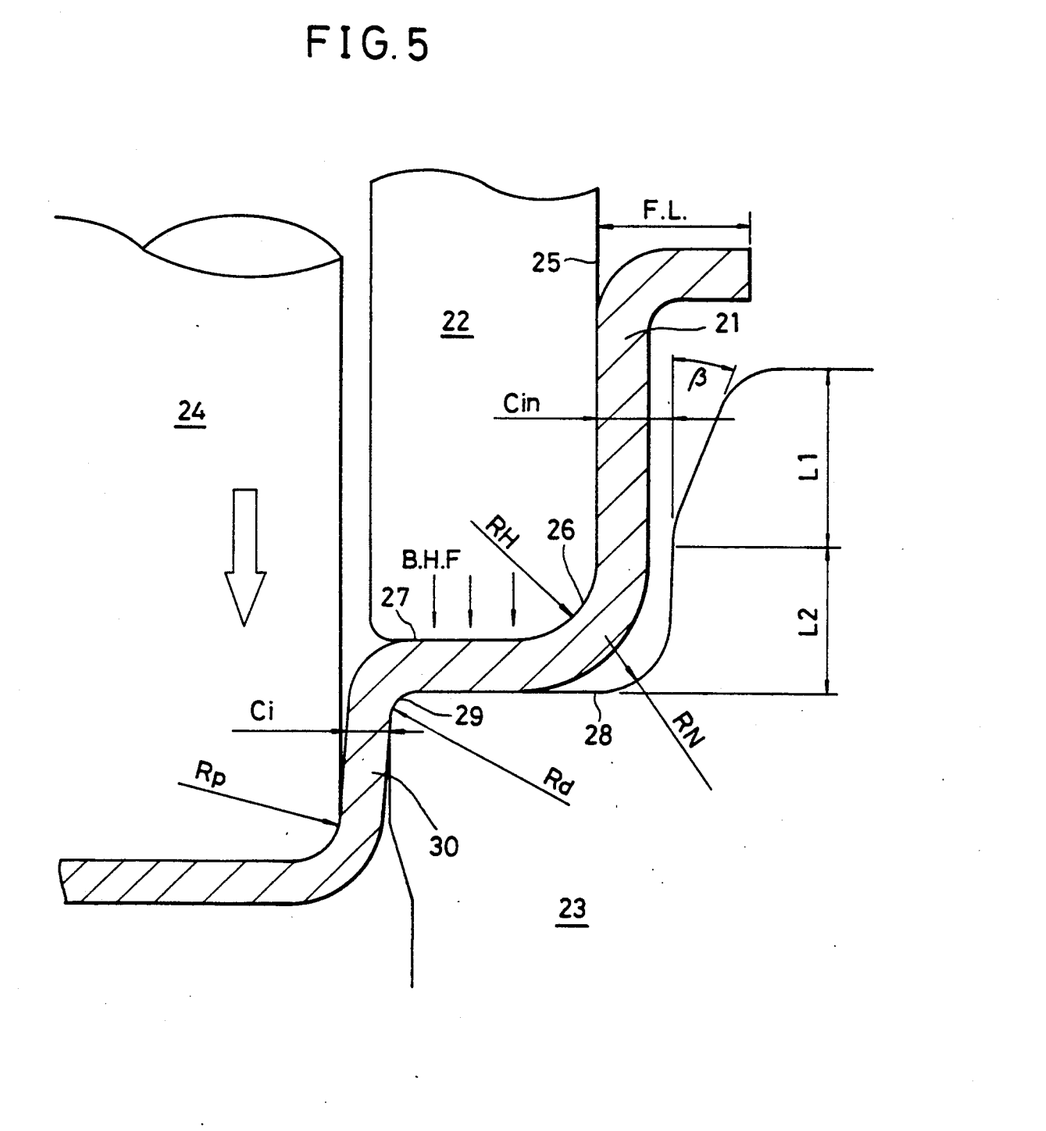
FIG. 5 is a diagram illustrating the redrawing process.

The drawn can of the present invention can be prepared according to known procedures except that the above-mentioned laminate is used. For example, according to the deep-drawn process (draw-redrawing process), as shown in FIG. 5, a predrawn cup 21 formed from the laminated metal plate is held by an annular holding member 22 inserted in the cup and a redrawing die located below the holding member 22. A redrawing punch 24 is arranged coaxially with the holding member 22 and redrawing die 23 so that the redrawing die can come into the holding member 22 and can go out therefrom. The redrawing punch 24 and redrawing die 23 are relatively moved so that they are engaged with each other.

Thus, the side wall portion of the predrawn cup 21 is bent vertically and inwardly with respect to the radial direction from the outer circumferential face 25 of the annular holding member 22 through a curvature corner portion thereof, passed through a portion defined by an annular bottom face of the annular holding member 22 and a top surface 28 of the redrawing die 23, and then bent substantially vertically in the axial direction by a working corner portion 29 of the redrawing die 23, whereby a deep-drawn cup 30 having a diameter smaller than that of the predrawn cup 21 is obtained.

In case of a deep-drawn can, it is preferred that the drawing ratio $R_D$, defined by the following formula:

$$R_D = D/d$$

wherein D represents the diameter of the shorn laminated material and d represents the diameter of the punch, be 1.1 to 3.0 at one stage and be 1.5 to 5.0 as a whole.

In the case where the thickness of the side wall is reduced by bending and elongating, it is preferred that the average thickness of the side wall portion be reduced to 95 to 55%, especially 95 to 60%, of the thickness ($t_B$) of the base metal.

According to the present invention, a metal plate laminated with a film of a polyester composed mainly of ethylene terephhthalate units, in which the X-ray diffraction intensity ratio is in the range of from 0.5 to 15 and the anisotropy index of the in-plane orientation of the crystals is less than 30, is provided as the laminated metal plate for a drawn can, and when this laminated plate is drawn, cracking or formation of pinholes can be prevented. Thus, a laminated metal plate for a drawn can, which has excellent workability and corrosion resistance, can be provided according to the present invention. A drawn can prepared from this laminated metal plate has an excellent corrosion resistance and an excellent adhesion between the metal surface and the organic film.

The present invention will now be described in detail with reference to the following examples that by no means limit the scope of the invention.

In the examples, the properties were determined according to the following methods.

(A) X-ray diffraction intensity ratio, $I_A/I_B$

The X-ray diffraction intensity ratio was determined according to the method described hereinbefore.

(B) Anisotropy index, $(n_{max} - n_{min}) \times 10^3 / n_{min}$

The anisotropy index was determined according to the method described hereinbefore.

(C) Formability

The formability was evaluated based on the presence or absence of shock lines, the presence or absence of peeling (delamination) of the film layer, and the degree of the metal exposure (enamel rater value ERV was measured).

(D) Corrosion resistance

Each of deep-drawn cans obtained in Examples 1 through 4 and Comparative Example 1 was filed with boiled salmon, double-seamed according to customary procedures and then sterilized. Just after the sterilization and after 3 months' storage at 37° C., the state of the inner face of the can was checked by the visual inspection.

Each of thickness-reduced deep-drawn cans was filled with a cola drink, double-seamed and stored for a long period. The corrosion state of the inner face of the can, the pitting and the leakage were checked.

(E) Heat resistance

With respect to thickness-reduced deep-drawn cans formed by printing the outer surface of the can and baking the coating layer (200° C., 3 minutes) after the drawing, the damage of the coating layer by denting was checked.

Biaxially drawn polyester films were prepared according to the following procedures.

Each of polyesters shown in the examples given hereinafter was melt-extruded in the form of a film at a temperature of 270° to 315° C. from a die slit, and was cooled and solidified on the surface of a cooling drum maintained at a temperature of 60° to 80° C. to obtain an amorphous polyester film.

This amorphous polyester film was supplied between a pair of rollers differing in the peripheral speed and was longitudinally drawn at a temperature of 80° to 90° C. at a longitudinal draw ratio shown in Table A. Then, the film was laterally drawn at a temperature of 95° to 110° C. at a lateral draw ratio shown in Table A by a tenter. The drawn polyester film was then thermally set in a heating chamber maintained at a temperature shown in Table A. Then, the film was rapidly cooled.

The obtained theremally set film (having a width of 1 m) was slit at parts 20 cm apart from both the ends, and an end film (E) and a center film (C) were used for the lamination.

TABLE A

| | Longitudinal Draw Ratio | Lateral Draw Ratio | Heat Setting Temperature (°C.) | Sample-Collecting Position |
|---|---|---|---|---|
| Example No. | | | | |
| 1 | 3.1 | 3.2 | 215 | C |
| 2 | 3.1 | 3.2 | 220 | C |
| 3 | 3.1 | 3.2 | 180 | E |
| 4 | 3.5 | 3.7 | 230 | E |
| 5 | 3.1 | 3.2 | 190 | E |
| 6 | 2.3 | 3.7 | 180 | C |
| 7 | 3.1 | 3.2 | 210 | C |
| 8 | 3.1 | 3.2 | 220 | E |
| 9 | 3.1 | 3.1 | 180 | C |
| Comparative Example No. | | | | |

TABLE A-continued

| | Longitudinal Draw Ratio | Lateral Draw Ratio | Heat Setting Temperature (°C.) | Sample-Collecting Position |
| --- | --- | --- | --- | --- |
| 1 | 3.1 | 3.2 | 180 | E |
| 2 | 3.5 | 3.7 | 160 | C |
| 3 | 3.1 | 3.2 | 195 | C |
| 4 | 3.1 | 3.2 | 215 | E |

EXAMPLE 1

A biaxially drawn polyethylene terephthalate/isophthalate copolymer film having a thickness of 25 μm, which was formed and sampled under conditions shown in Table A, was hot-laminated at 230° C., that is, the melting point of the polyester film, on both of the surfaces of a tin-free steel (TFS) plate having a thickness of 0.18 mm and a tempering degree of DR-9, and the laminate was immediately cooled with water to obtain a laminated metal plate having an organic film. Palm oil was coated on the laminated metal plate and a can body was prepared by the two-staged drawing. At the first stage of the drawing, a disc having a diameter of 126 mm was punched out from the laminated metal plate and the disc was formed into a flanged cup at a draw ratio of about 1.5. At the second stage of drawing, a flanged cup having a drawing ratio of about 1.3 was formed. Trimming of the open end portion and flanging were carried out according to customary procedures to obtain a deep-drawn can having a diameter of 66 mm and a height of 37 mm.

The characteristics and evaluation results of the obtained can body are shown in Table 1.

It is seen that a deep-drawn can having excellent corrosion resistance and heat resistance was obtained in this example.

EXAMPLE 2

A deep-drawn can having properties shown in Table 1 was prepared in the same manner as described in Example 1 except that a polyethylene terephthalate/isophthalate copolymer prepared and sampled under conditions shown in Table A was used as the polyester film and the lamination temperature was changed to 240° C., that is, the melting point of the polyester film.

It is seen that a deep-drawn can having excellent corrosion resistance and heat resistance was obtained in the present example.

EXAMPLE 3

A deep-drawn can having properties shown in Table 1 was prepared in the same manner as described in Example 1 except that a polyethylene terephthalate/isophthalaten copolymer film prepared and sampled under conditions shown in Table A was used as the polyester film and the lamination temperature was changed to 245° C., that is, the temperature was higher by 15° C. than the melting point of the polyester film.

It is seen that a deep-drawn can having excellent corrosion resistance and heat resistance was obtained in the present example.

EXAMPLE 4

A deep-drawn can having properties shown in Table 1 was prepared in the same manner as described in Example 1 except that a polyethylene terephthalate film prepared and sampled under conditions shown in Table A was used as the polyester film and the lamination temperature was changed to 260° C., that is, the temperature higher by 5° C. than the melting point of the polyester film.

Slight whitening was observed on the outer surface film but this was not practically significant. It is seen that a deep-drawn can having excellent corrosion resistance and heat resistance was obtained in the present example.

COMPARATIVE EXAMPLE 1

By using the same polyester film as used in Example 3, a deep-drawn can having properties shown in Table 1 was prepared in the same manner as described in Example 3 except that the lamination temperature was changed to 230° C., that is, the melting point of the polyester film.

It is seen that the can body of the present example where $I_A/I_B$ was outside the range specified in the present invention was poor in the formability and corrosion resistance.

EXAMPLE 5

An adhesive primer coating for a polyester film was prepared in the following manner.

Namely, a mixed phenol comprising 75% by weight of bisphenol A and 25% by weight of p-cresol was reacted with formaldehyde in the presence of a basic catalyst, and the reaction product was purified and dissolved in a solvent to form a solution of a resol type phenol-formaldehyde resin.

A solution of a bisphenol A type epoxy resin (Epikote 1009) was mixed with the above solution of the cresol type phenol-formaldehyde resin at a solid weight ratio of 70/30, and precondensation was carried out to form an adhesive primer coating.

The adhesive primer coating was coated in an amount of 10 mg/dm$^2$ as solids on one surface of a polyethyleneterephthalate/isophthalate copolyester film having a thickness of 20 um, which was prepared and sampled under conditions shown in Table A, and the coated film was dried at 60° C.

The above-mentioned copolyester film was supplied onto both the surface of a TFS plate having a thickness of 0.15 mm and a tempering degree of DR-9 so that the TFS plate was contacted with the adhesive primer layer. Hot lamination was carried out at 240° C., that is, the melting point of the polyester film, and the laminate was immediately water-cooled. The plate having both the surfaces laminated was heated at a temperature of 220° C. to effect curing of the primer and form a laminated metal plate. The laminated metal plate was coated with palm oil and punched into a disc having a diameter of 187 mm, and a shallow-drawn cup was prepared according to customary procedures. The drawing ratio was 1.4.

At the subsequent primary, secondary and third redrawing step, the drawn cup was preliminarily heated and the redrawing was carried out. The conditions adopted at these redrawing steps were as follows.

Primary redraw ratio: 1.25
Secondary redraw ratio: 1.25
Third redraw ratio: 1.25
Curvature radius (Rd) of working corner portion of redrawing die: 0.40 mm The characteristics of the deep-drawn can prepared by the above-mentioned redraw forming were as follows.

Cup diameter: 66 mm
Cup height: 140 mm
Thickness reduction of side wall: −20%

The doming was carried out according to customary procedures, and palm oil was removed by degreasing with washing water and trimming was carried out. Then, the neck-in/flanging was carried out to obtain a thickness-reduced, deep-drawn can.

The characteristics and evaluation results of the obtained can body are shown in Table 1.

It is seen that a thickness-reduced, deep-drawn can having excellent corrosion resistance and heat resistance was obtained in the present example.

COMPARATIVE EXAMPLE 2

A thickness-reduced, deep-drawn can having properties shown in Table 1 was prepared in the same manner as described in Example 5 except that a polyethylene terephthalate film prepared and sampled under conditions shown in Table A was used as the polyester film, the lamination temperature was changed to 240° C., that is, the temperature lower by 15° C. than the melting point of the polyester film, and the curing temperature was changed to 205° C.

The can body obtained in the present example, in which $I_A/I_B$ deviated greatly from the range specified in the present invention, was extremely poor in the formability.

COMPARATIVE EXAMPLE 3

A thickness-reduced, deep-drawn can having characteristics shown in Table 1 was prepared in the same manner as described in Example 5 except that a polyethylene terephthalate/isophthalate copolyester film prepared and sampled under conditions shown in Table A was used as the polyester film, the lamination temperature was adjusted to 215° C., that is, the melting point of the polyester film, and the curing temperature was changed to 210° C.

The can body obtained in the present example, in which $I_A/I_B$ was outside the range specified in the present invention, was poor in heat resistance and corrosion resistance, and the can body was not suitable as a container vessel.

COMPARATIVE EXAMPLE 4

A deep-drawn can having characteristics shown in Table 1 was prepared in the same manner as described in Example 5 except that a polyethylene terephthalate/isophthalate copolyester film prepared and sampled under conditions shown in Table A was used as the polyester film.

In the can body obtained in the present example, in which the anisotropy index was outside the range specified in the present invention, conspicuous partial whitening by shock lines was caused and delamination of the film was caused in the flange portion, and therefore, the can body was not suitable as a container vessel.

EXAMPLE 6

A thickness-reduced, deep-drawn can having characteristics shown in Table 1 was prepared in the same manner as described in Example 5 except that a polyethylene terephthalate/isophthalate copolyester film prepared and sampled under conditions shown in Table A was used as the polyester film, the lamination temperature was changed to 245° C., that is, the temperature higher by 15° C. than the melting point of the polyester film, and the curing temperature was changed to 220° C.

Slight whitening was observed on the outer face film, but this was not practically significant. A deep-draw-formed can having excellent corrosion resistance and heat resistance was obtained.

EXAMPLE 7

A thickness-reduced, deep-drawn can having characteristics shown in Table 1 was prepared in the same manner as described in Example 5 except that a polyethylene terephthalate/isophthalate copolyester film prepared and sampled under conditions shown in Table A was used as the polyester film, a plate of an aluminum alloy of the Al-Mn type having a thickness of 0.26 mm was used as the metal plate, each of the lamination temperature and curing temperature lower by 5° C. than the melting point of the polyester film, and the curvature radius (Rd) of the working corner portion of the redrawing die was changed to 0.60 mm.

It is seen that the thickness-reduced, deep-drawn can having excellent corrosion resistance and heat resistance was obtained in the present example.

EXAMPLE 8

In the same manner as described in Example 5, the adhesive primer coating was coated and dried on one surface of a polyethylene terephthalate/adipate film prepared and sampled under conditions shown in Table A. A TFS plate having a thickness of 0.13 mm and a tempering degree of DR-9 was heated at 240° C., that is, the melting point of the polyester film, and the above-mentioned copolyester film was supplied onto one surface of the TFS plate so that the TFS plate was contacted with the adhesive primer layer. Hot lamination was carried out and the laminate was immidiately cooled with water. Then, a vinyl chloride organosol coating was coated in a dry film thickness of 10 μm on the uncoated surface of the TFS plate, and the coating was dried at 220° C. to obtain a coated metal plate. A thickness-reduced, deep-drawn can was prepared in the same manner as described in Example 5, so that the polyethylene terephthalate/adipate film face was formed into the inner face of the can. The characteristics and evaluation results of the obtained can body are shown in Table 1. It is seen that a vessel having excellent formability, heat resistance and corrosion resistance was obtained in the present example.

TABLE 1

| Characteristics and Evaluation Results of Deep-Drawn Cans | | | | |
|---|---|---|---|---|
| | Polyester Film | | Heat Treatment Temperature | |
| | resin composition | melting point (°C.) | lamination temperature (°C.) | curing temperature (°C.) | $I_A/I_B$ |
| Example No. | | | | | |
| 1 | PET/I | 230 | 230 | — | 4.9 |
| 2 | PET/S | 240 | 240 | — | 8.5 |
| 3 | PET/I | 230 | 245 | — | 6.0 |
| 4 | PET | 255 | 260 | — | 14.5 |
| Comparative Example 1 | PET/I | 230 | 230 | — | 15.5 |
| Example No. 5 | PET/I | 240 | 240 | 220 | 7.4 |
| Comparative | | | | | |

TABLE 1-continued

Characteristics and Evaluation Results of Deep-Drawn Cans

| Example No. | | | | | |
|---|---|---|---|---|---|
| 2 | PET | 255 | 240 | 205 | 20.3 |
| 3 | PET/I | 215 | 215 | 200 | 0.3 |
| 4 | PET/I | 230 | 230 | 220 | 4.4 |
| Example No. | | | | | |
| 6 | PET/I | 230 | 245 | 220 | 10.5 |
| 7 | PET/I | 230 | 225 | 225 | 0.6 |
| 8 | PET/A | 240 | 240 | 220 | 5.8 |
| 9 | PET/I | 212 | 220 | — | 1.0 |

| | Anisotropy Index | Formability | Corrosion Resistance | Heat Resistance |
|---|---|---|---|---|
| Example No. | | | | |
| 1 | 8.7 | good | good | good |
| 2 | 4.4 | good | good | good |
| 3 | 9.2 | good | good | good |
| 4 | 1.0 | outer face; slight whitening of film inner face; good | good | good |
| Comparative Example No. 1 | 0.6 | outer face; breaking of film inner face; whitening of film | pitting, leakage | good |
| Example 5 | 3.8 | good | good | good |
| Comparative Example 2 | 1.0 | outer face; breaking of film inner face; breaking of film | not evaluated | not evaluated |
| Comparative Example 3 | 13 | good | flistring, UFC | cracking of film |
| Comparative Example 4 | 32 | outer face; formation of shock lines inner face; delamination of film in flange portion | shock lines, corrosion of flange portion | good |
| Example No. | | | | |
| 6 | 27 | outer face; slight whitening of film inner face; good | good | good |
| 7 | 28 | good | good | good |
| 8 | 22 | good | good | good |
| 9 | 25 | good | good | good |

Note:
PET: polyethylene terephthalate
PET/I: polyethylene terephthalate/isophthalate
PET/S: polyethylene terephthalate/sebacate
PET/A: polyethylene terephthalate/adipate
UFC: underfilm corrosion (corrosion below film)

EXAMPLE 9

In the same manner as described in Example 5, the adhesive primer coating was prepared.

The adhesive primer coating was coated in an amount of 10 mg/dm² as solids on both of the surfaces of a TFS plate having a thickness of 0.15 mm and a tempering degree of DR-9.

The adhesive primer coating was dried at 230° C. to obtain the cured adhesive primer layer.

A biaxially drawn polyethylene terephthalate/isophthalate copolyester film having a thickness of 15 μm was prepared and sampled under conditions shown in Table A.

The above-mentioned copolyester film was supplied onto both the adhesive primer layer of the coated TFS. Hot lamination was carried out at 220° C., that is, the temperature higher by 8° C. than the melting point of the polyester film, and the laminate was immediately water-cooled.

A thickness-reduced, deep-drawn can having characteristics shown in Table 1 was prepared in the same manner as described in Example 5 except that the above-mentioned laminate was used.

It is seen that a vessel having excellent formability, heat resistance, and corrosion resistance was obtained in the present example.

We claim:

1. A coated laminated metal plate for producing a drawn can, which comprises a laminate comprising a base metal, a layer of a film of a polyester and, optionally, an adhesive primer layer interposed between the base metal and the polyester film layer, wherein the polyester of the film layer has a melting point of 210° to 252° C. and comprises at least 75 mol %, based on the dibasic acid component, of terephthalic acid, at least 75 mol %, based on the diol component, of ethylene glycol, and at least 5 to 25 mol % based on the dibasic acid component or the diol component, of a dibasic acid other than terephthalic acid or a diol other than ethylene glycol, with the proviso that the dibasic acid other than terephthalic acid is selected from at least one member of the group consisting of isophthalic acid, phthalic acid, naphthalene-dicarboxylic acid, cyclohexane-dicarboxylic acid, succinic acid, adipic acid, sebacic acid and dodecaedioic acid, and the diol other than ethylene glycol is selected from at least one member of the group consisting of propylene glycol, 1,4-butane-diol, diethylene glycol, 1,6-hexylene glycol, cyclohexane dimethanol and an ethylene oxide adduct of bisphenol A, and the film of the polyester is drawn in the ratio of 2.5 to 16.0 defined as an area draw ratio, at a temperature of 80° to 100° C. and is thermally set at a temperature of 130° to 240° C., and the X-ray diffraction intensity ratio, defined by the following formula (I), of the polyester film layer is from 0.5 to 15:

$$R_x = I_A/I_B \qquad (I)$$

wherein $R_x$ represents the X-ray diffraction intensity ratio, $I_A$ represents the X-ray diffraction intensity of the diffraction plane parallel to the surface of the polyester film, which had a spacing of about 0.34 nm with a CuKα X-ray diffraction angle of 24° to 28°, and $I_B$ represents the X-ray diffraction intensity of the diffraction plane parallel to the polyester film surface, which has a spacing of about 0.39 nm with a CuKα X-ray diffraction angle of 21.5° to 24°, and the in-plane anisotropy index of the crystals of the film layer is less than 30.

2. A drawn can prepared by drawing a coated laminated metal plate which comprises a laminate comprising a base metal, a layer of a film of a polyester and, optionally, an adhesive primer layer interposed between the base metal and the polyester film layer, wherein the polyester of the film layer has a melting point to 210° to 252° C. and comprises at least 75 mol %, based on the dibasic acid component, of terephthalic acid, at least 75 mol %, based on the diol component, of ethylene glycol, and at least 5 to 25 mol %, based on the diol component, of ethylene glycol, and at least 5 to 25 mol % based on the dibasic acid component or the diol component, of a dibasic acid other than terephthalic acid or a diol other than ethylene glycol, with the proviso that the dibasic acid other than terephthalic acid is selected from at least one member of the group consisting of isophthalic acid, phthalic acid, naphthalene-dicarboxylic acid, cyclohexane-dicarboxylic acid, succinic acid, adipic acid, sebacic acid and dodecaedioic acid and the diol other than ethylene gulcol is selected from at least one member of the group consisting of propylene glycol, 1,4-butane-diol, diethylene glycol, 1,6-hexylene glycol, cyclohexane dimethanol and an ethylene oxide adduct of bisphenol A, and the film of the polyester is drawn in the ratio of 2.5 to 16.0 defined as an area draw ratio, at a temperature of 80° to 110° C. and is thermally set at a temperature of 130° to 240° C., and wherein the X-ray diffraction intensity ratio, defined by the following formula (I), of the polyester film layer is from 0.5 to 15:

$$R_x = I_A/I_B \quad (I)$$

wherein $R_x$ represents the X-ray diffraction intensity ratio, $I_A$ represents the X-ray diffraction intensity of the diffraction plane parallel to the surface of the polyester film, which had a spacing of about 0.34 nm with a CuKα X-ray diffraction angle of 24° to 28°, $I_B$ represents the X-ray diffraction intensity of the diffraction plane parallel to the polyester film surface, which has a spacing of about 0.39 nm with a CuKα X-ray diffraction angle of 21.5° to 24°, and the in-plane anisotropy index of the crystals of the film layer is less than 30.

3. A thickness-reduced, drawn can prepared by drawing and redrawing a coated laminated metal plate which comprises a laminate comprising a base metal, a layer of a film of a polyester and, optionally, an adhesive primer layer interposed between the base metal and the polyester film layer, wherein the polyester of the film layer has a melting point of 210° to 252° C. and comprises at least 75 mol %, based on the dibasic acid component, of terephthalic acid, at least 75 mol %, based on the diol component, of ethylene glycol, and at least 5 to 25 mol % based on the dibasic acid component or the diol component, of a dibasic acid other than terephthalic acid or a diol other than ethylene glycol, with the proviso that the dibasic acid other than terephthalic acid is selected from at least one member of the group consisting of isophthalic acid, phthalic acid, naphthalene-dicarboxylic acid, cyclohexane-dicarboxylic acid, succinic acid, adipic acid, sebacic acid and dodecaedioic acid and the diol other than ethylene glycol is selected from at least one member of the group consisting of propylene glycol, 1,4-butane-diol, diethylene glycol, 1,6-hexylene glycol, cyclohexane dimethanol and an ethylene oxide adduct of bisphenol A, and the film of the polyester is drawn in the ratio of 2.5 to 16.0 defined as an area draw ratio, at a temperature of 80° to 110° C. and is thermally set at a temperature of 130° to 240° C., and wherein the X-ray diffraction intensity ratio, defined by the following formula (I), of the polyester film layer is from 0.5 to 15:

$$R_x = I_A/I_B \quad (I)$$

wherein $R_x$ represents the X-ray diffraction intensity ratio, $I_A$ represents the X-ray diffraction intensity of the diffraction plane parallel to the surface of the polyester film, which had a spacing of about 0.34 nm with a CuKα X-ray diffraction angle of 24° to 28°, $I_B$ represents the X-ray diffraction intensity of the diffraction plane parallel to the polyester film surface, which has a spacing of about 0.39 nm with a CuKα X-ray diffraction angle of 21.5° to 24°, and the in-plane anisotropy index of the crystals of the film layer is less than 30.

4. A thickness-reduced, drawn can prepared by drawing and redrawing a laminated metal plate and reducing the thickness of the side wall portion of the can barrel by bending and elongating in the redrawing step, wherein said laminated metal plate comprises a laminate comprising a base metal, and a layer of a film of a polyester applied to the surface of the base metal, wherein the polyester of the film layer has a melting point of 210° to 252° C. and comprises at least 75 mol %, based on the dibasic acid component, of terephthalic acid, at least 75 mol %, based on the diol component of ethylene glycol, and at least 5 to 25 mol %, based on the dibasic acid component, or the diol component, of a dibasic acid other than terephthalic acid or a diol other than ethylene glycol, with the proviso that the dibasic acid other than terephthalic acid is selected from at least one member of the group consisting of isophthalic acid, phthalic acid, naphthalene-dicarboxylic acid, cyclohexane-dicarboxylic acid, succinic acid, adipic acid, sebacic acid and dodecaedioic acid, and the diol other than ethylene glycol is selected from at least one member of the group consisting of propylene glycol, 1,4-butane-diol, diethylene glycol, 1,6-hexylene glycol, cyclohexane dimethanol and an ethylene oxide adduct of bisphenol A, and the film of the polyester is drawn in the ratio of 2.5 to 16.0 defined as an area draw ratio, at a temperature of 80° to 110° C. and is thermally set at a temperature of 130° to 240° C., and wherein the X-ray diffraction intensity ratio (Rx) defined by the following formula (I), of the polyester film layer from 0.5 to 15:

$$R_x = I_A/I_B \quad (I)$$

wherein $R_x$ represents the X-ray diffraction intensity ratio, $I_A$ represents the X-ray diffraction intensity of the diffraction plane parallel to the surface of the polyester film, which had a spacing of about 0.34 nm with a CuKα X-ray diffraction angle of 24° to 28°, and $I_B$ represents the X-ray diffraction intensity of the diffraction plane parallel to the polyester film surface, which has a spacing of about 0.39 nm with a CuKα X-ray diffraction angle of 21.5° to 24°, and the in-plane anisotropy index of the crystals of the film layer is less than 30.

* * * * *